United States Patent
Engelbreit et al.

(10) Patent No.: US 8,276,450 B2
(45) Date of Patent: Oct. 2, 2012

(54) METHOD FOR OPTIMALLY OPERATING TRANSMISSIONS

(75) Inventors: Michael Engelbreit, Riedenheim (DE); Thomas Bayer, Igersheim (DE)

(73) Assignee: Wittenstein AG, Igersheim (DE)

( * ) Notice: Subject to any disclaimer, the term of this patent is extended or adjusted under 35 U.S.C. 154(b) by 276 days.

(21) Appl. No.: 12/595,277

(22) PCT Filed: Apr. 2, 2008

(86) PCT No.: PCT/EP2008/002625
§ 371 (c)(1),
(2), (4) Date: Dec. 29, 2009

(87) PCT Pub. No.: WO2008/125218
PCT Pub. Date: Oct. 23, 2008

(65) Prior Publication Data
US 2010/0089163 A1  Apr. 15, 2010

(30) Foreign Application Priority Data

Apr. 12, 2007 (DE) .................. 10 2007 017 614

(51) Int. Cl.
*G01M 13/02* (2006.01)

(52) U.S. Cl. ........................................ 73/593

(58) Field of Classification Search ............ None
See application file for complete search history.

(56) References Cited

U.S. PATENT DOCUMENTS

| | | | |
|---|---|---|---|
| 4,776,224 A * | 10/1988 | Maezawa et al. | 74/7 E |
| 5,197,010 A | 3/1993 | Andersson | |
| 5,952,587 A | 9/1999 | Rhodes et al. | |
| 6,225,892 B1 | 5/2001 | Chene | |
| 6,484,582 B2 | 11/2002 | Ehrfeld et al. | |
| 6,873,917 B2 | 3/2005 | Ulrich et al. | |
| 7,826,912 B2 | 11/2010 | Barton et al. | |
| 2004/0055398 A1 | 3/2004 | Weyer et al. | |
| 2004/0210352 A1 | 10/2004 | Bayer et al. | |
| 2006/0106549 A1 * | 5/2006 | Olsson | 702/34 |
| 2011/0196526 A1 | 8/2011 | Barton et al. | |

FOREIGN PATENT DOCUMENTS

| | | |
|---|---|---|
| DE | 19937203 A1 | 3/2000 |
| DE | 10017572 A1 | 10/2001 |
| DE | 10039015 | 1/2002 |
| DE | 10120943 A1 | 11/2002 |
| DE | 10156330 A1 | 4/2003 |
| DE | 10215865 A1 | 11/2003 |
| DE | 10310116 A1 | 9/2004 |
| DE | 102005003983 | 8/2006 |
| DE | 102006031645 A1 | 1/2007 |
| EP | 1408259 | 4/2004 |
| WO | 0211926 A1 | 2/2002 |

* cited by examiner

*Primary Examiner* — Hezron E Williams
*Assistant Examiner* — Mark A Shabman
(74) *Attorney, Agent, or Firm* — Bachman & LaPointe, P.C.

(57) ABSTRACT

A method for optimally operating mechanically loaded, moved, particularly rotating components, such as gearboxes, wherein in the operating stage damage accumulation is used to evaluate the influence of a collective load on the lifespan of the loaded rotating components, the moving components (1) being divided into a plurality of segments (5-10) for determining individual collective loads (6; 18).

6 Claims, 4 Drawing Sheets

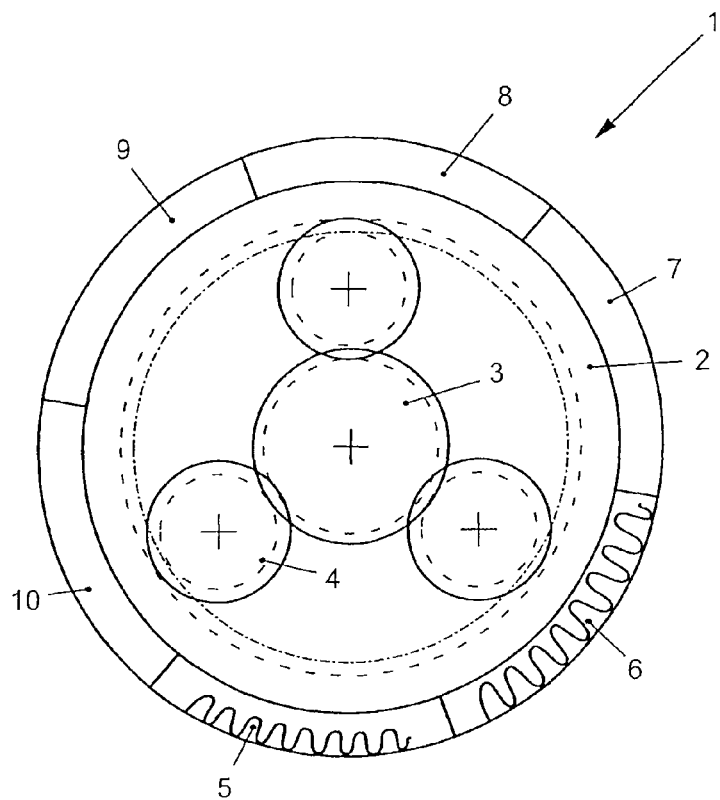
Fig. 1
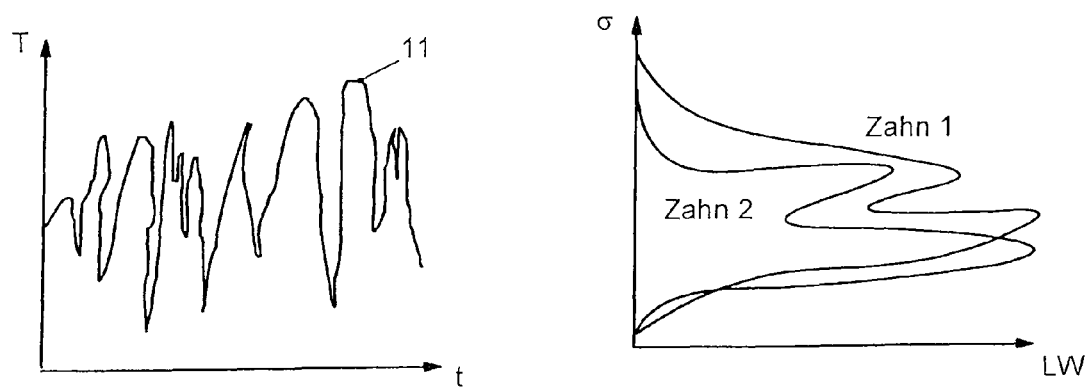
Fig. 2
Fig. 3

METHOD FOR OPTIMALLY OPERATING TRANSMISSIONS

BACKGROUND OF THE INVENTION

The invention relates to a method for optimally operating mechanically stressed, moving, in particular rotating components, such as transmissions, in which, in the operating state, an accumulation of damage is used to assess the influence of a load collective on the service life of the mechanically stressed components.

As is known, an accumulation of damage is used to assess the influence of a load collective on the service life of a component. In a normal situation, a rotating component is subject not only to a vibratory loading at constant amplitudes, i.e. to a rectangular loading collective, as used, for example, in the "Wöhler fatigue test", but the level of the loading is also variable. The loading essentially involves dynamic loadings which may lead to material fatigue, i.e. the respective component may be locally damaged. If said damage exceeds a certain limit value, the consequence may be, for example, the formation of cracks and therefore fracturing of the component. The number of load cycles tolerated by a component until it fails is then referred to as the service life of the component. Each load cycle may produce a certain amount of damage which, in total, results in an overall level of damage dealt with by the linear accumulation of damage.

It is an object of the present invention to provide a method for optimally operating in particular highly loaded, rotating components in which the service life of said components is to be increased with the aid of a specifically used accumulation of damage.

SUMMARY OF THE INVENTION

The foregoing object is achieved by virtue of the fact that, in order to determine individual load collectives, the moving components are divided into a plurality of segments.

According to the invention, the segments are preferably distributed over the circumference of the rotating components in the manner of circular segments, wherein the respective damage potential of said segments is determined on the basis of the actual loadings. The respective suitable operating characteristic for the actual loading is expediently measured in terms of the maximum height thereof and additionally in terms of the frequency of occurrence thereof (load cycle).

The respective individual load collectives are advantageously combined to form a stress collective, the term "load collective" originating from the structural durability and referring in very general terms to the totality of all of the vibration amplitudes which occur on a component over a certain period of time. This is because, in practice, vibrating loadings rarely occur with a single stage, i.e. with just a single amplitude. As a rule, there are many different amplitudes without a fixed sequence.

Torques, rotational speeds, accelerations, speeds of revolution, temperatures and the like can be used in particular as parameters of the individual load collectives.

The method according to the invention is particularly also advantageously distinguished in that that circular segment of the rotating component which has the highest measured stress collective is relieved of load by modulating the respective operating characteristic, which again is advantageous in terms of improving the service life of the rotating component. In this connection, the modulation can take place by some of the stress from the highest stress collective being distributed to one or more segments loaded to a lesser extent, it expediently being possible in this case for the actual loading data to be transmitted wirelessly to an electronic computer for calibration of said data.

The method according to the invention is particularly suitable for the design of transmissions and, as an exemplary embodiment here, for the design of a planetary transmission in which the load can be distributed over the toothing, it also being possible, for example, for rack and pinion drives to likewise be optimized.

BRIEF DESCRIPTION OF THE DRAWINGS

Further features and advantages of the present invention emerge from the description below of a preferred exemplary embodiment in conjunction with the drawing, in which FIG. 1 shows a schematic side view of a planetary transmission, FIG. 2 shows a graph of the loading curve during accumulation of damage on a toothing;

FIG. 3 shows a graph of a stress collective according to FIG. 2;

DETAILED DESCRIPTION

Figure 4:
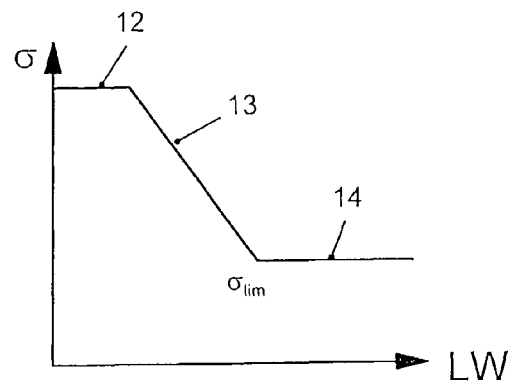
FIG. 4 shows a graph showing a customary material Wöhler line, for example, for a material 17CrNiMo6.

The planetary transmission which is illustrated schematically in side view in FIG. 1 and is referred to as a whole by 1 has a crown wheel 2, a sun wheel 3 and three pinions 4. The crown wheel 2 is divided into six metrological segments 5 to 10 which are loaded to different extents by the pinions 4, indicated at the segments 5 and 6, i.e., in this exemplary embodiment, the segment 6 is loaded more heavily than the segment 5, and therefore failure of the transmission may occur first in said more heavily loaded region of the planetary transmission 1.

A typical loading curve 11, such as may be present in the segment 6 of the planetary mechanism 1 according to FIG. 1, is illustrated in FIG. 2 where a loading in the form of torques (torsion T) is plotted over time (t). By contrast, a stress collective with respect to the toothing is shown in FIG. 3 using the example of two teeth, the alternating stress amplitudes ($\sigma$) being plotted over the load alternation (LW) in said graph.

The basis of virtually any calculation of strength of a transmission involves the "Wöhler curves" which are measured using simple, generally cylindrical test pieces. The respective test piece is exposed to a dynamic load with a constant amplitude, and the associated tolerable endurance for various load situations is entered into a diagram which is depicted in FIG. 4 using the example of the material 17CrNiMo6. In this case, the horizontal straight line which is referred to by 12 indicates the range of short-term fatigue strength or fatigue strength under short-term vibratory stresses (K), which is followed by a dropping straight line 13, which indicates the range of fatigue strength for a finite life or fatigue strength under finite vibratory stresses (Z), which is subsequently followed by a petering out straight line 14 which represents the range of the "fatigue limit" (D).

Figure 5:
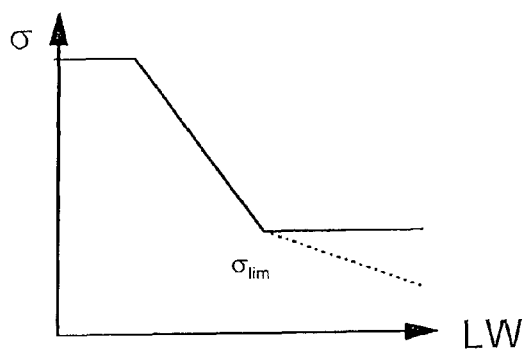
FIG. 5 shows a graph showing a gearwheel Wöhler line using the example of a pinion.
Figure 6:
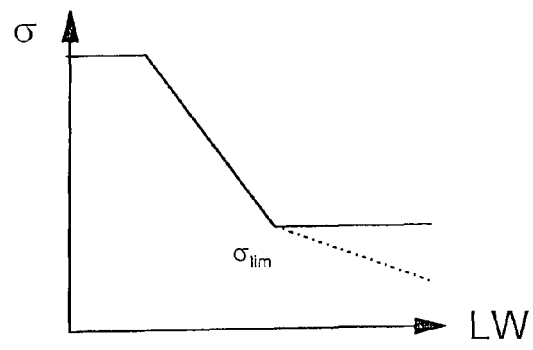
FIG. 6 shows a graph showing a Wöhler line based on a pinion tooth.
Figure 7:
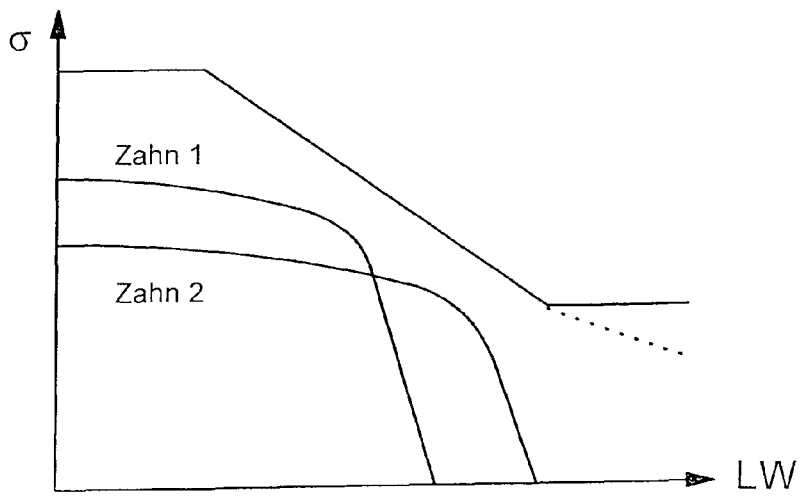
FIG. 7 shows a graph of an accumulation of damage with respect to a Wöhler line based on two pinion teeth.

Corresponding thereto, the graphs of FIGS. 5 to 7 depict Wöhler lines, of which the Wöhler line in FIG. 5 represents a pinion 4 and that in FIG. 6 represents a tooth of said pinion 4. By contrast, FIG. 7 depicts an accumulation of damage of two teeth.

Figure 8:
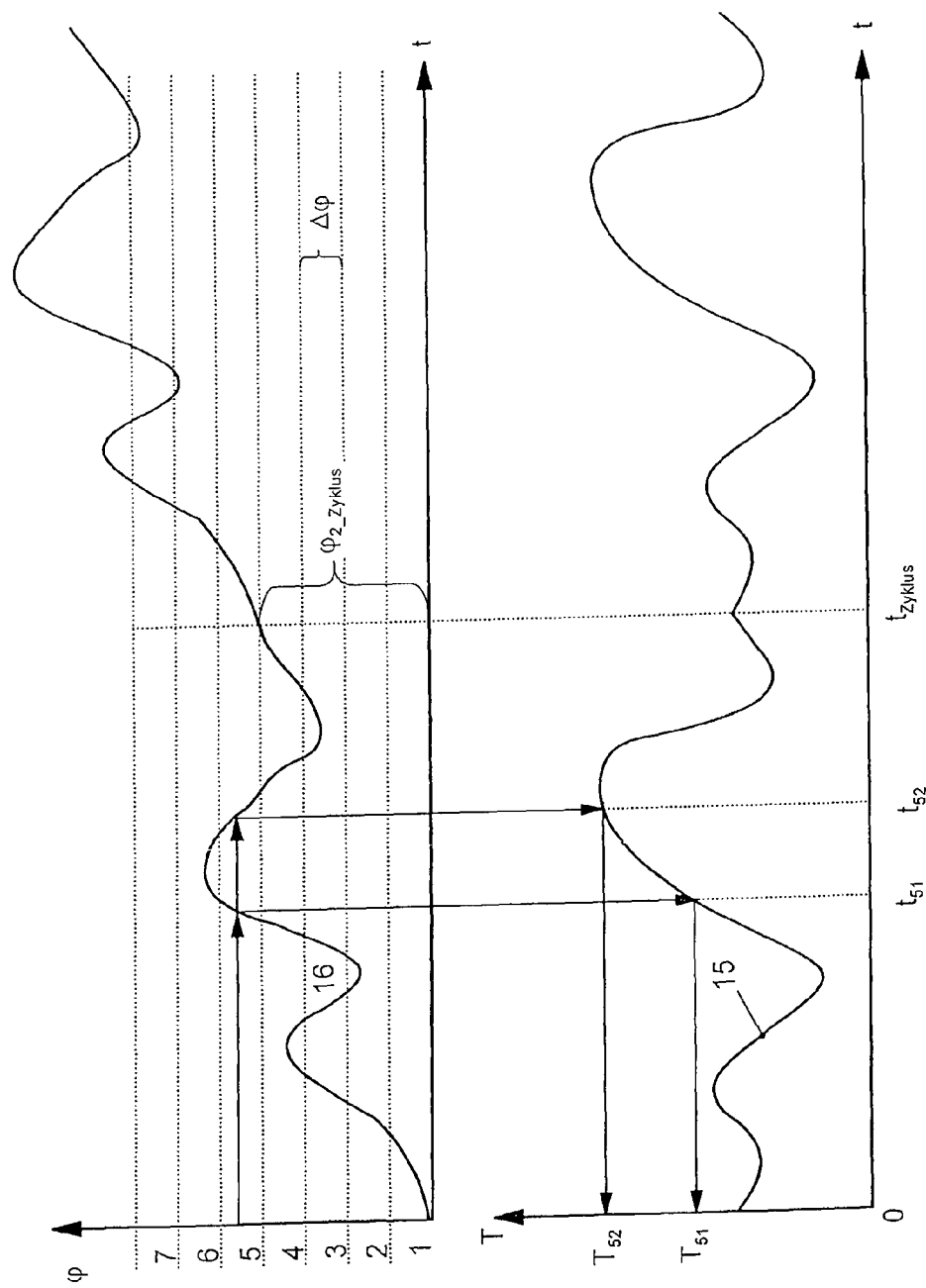
FIG. 8 shows a graph of a finite accumulation of damage with respect to an individual load collective.

FIG. 8 shows two graphs which are arranged one above the other and depict individual load collectives 15 and 16. In the lower graph, the torques (T) are plotted over time (t), and in the upper graph the respective angles of rotation ($\phi$) based on individual teeth 1 to 7 are plotted over time (t).

Figure 9:
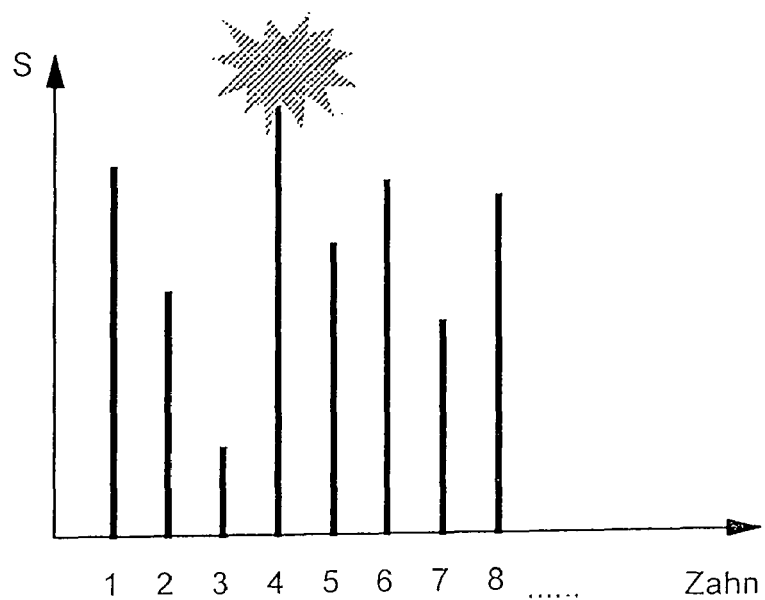
FIG. 9 shows a graph of damage totals (according to Miner)

If the individual load collectives are added up, the graph as per FIG. 9 is arrived at where the damage totals (S) are plotted over the individual teeth 1 to 8, in which, in the case of the tooth with the number 4, a situation is indicated (exploding star) in which, due to the level of the damage total (S), a fracturing of the tooth has taken place, which is also reproduced in FIGS. 5 to 7 by the dashed lines shown in each case there, i.e. the respective fatigue strength under finite vibratory stresses (Z) has not reached the fatigue limit (D).

Figure 10:
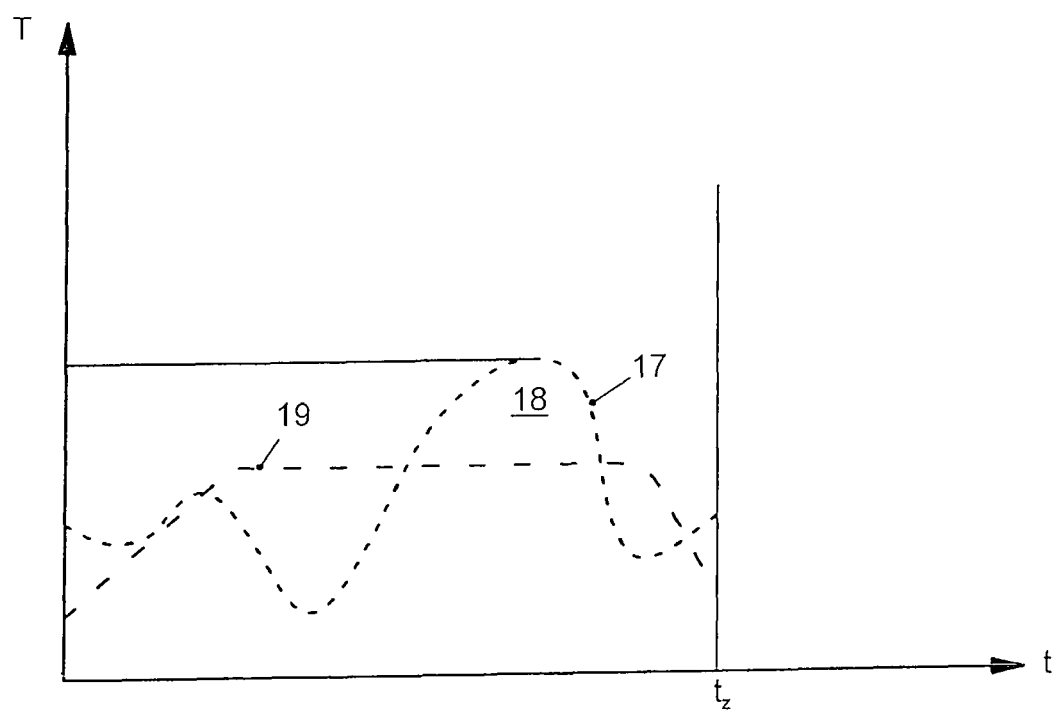
FIG. 10 shows a graph of an individually modulated load collective.

Finally, the graph according to FIG. 10 shows a loading cycle (tz) with an individual load collective 17, using the example of torques (T) plotted over time (t), the maximum 18 of which load collective has been modulated in such a manner that it reproduces the curve profile referred to by 19, i.e., for example, the circular segment 6 in FIG. 1 having the highest measured stress collective has been modulated by modeling via an electronic computer (not illustrated specifically) in such a manner that said segment 6 is relieved of the load by said operating characteristic (torque), to be precise by some of the stress (peak load) of the highest stress collective being distributed to one or more segments 6 to 10 loaded to a lesser extent.

As a result, the rotating component in the form, for example, of the planetary transmission 1, is loaded more uniformly in the operating state, and therefore the service life of the components is substantially extended in a predeterminable manner, to be precise by 2 to 10 times, and hence components of this type also gain in value.

All in all, the method according to the invention therefore provides an economic solution for optimally operating mechanically stressed, in particular rotating components, in which the actual loadings of the components in the effect of said loadings as mechanical stress for the individual, metrologically divided segments of the components are distributed approximately uniformly to said segments, to be precise by, in the manner of a balancing operation, the different loadings undergoing an evening out of the individual loadings by being calibrated by means of an electronic computer and therefore resulting in a not insubstantial increase in the service life.

The invention claimed is:

1. A method for operating mechanically stressed, moving, components in which, in the operating state, an accumulation of damage is used to assess the influence of a load collective on the service life of the loaded components, wherein, in order to determine individual load collectives, the moving components are divided into a plurality of segments, and the respective individual load collectives are combined to form an individual stress collective, wherein at least one segment of the component having the highest determined stress collective is relieved of load by modulating an operating characteristic, wherein said components are rotating, said segments are circular segments, and wherein a torque or a rotational speed is modulated as said operating characteristic, and wherein the modulation takes place by shifting some of the load from the segment having the highest determined stress collective to one or more segments having a lower determined stress collective.

2. The method as claimed in claim 1, wherein the load cycle of the maximum occurring loading is additionally measured as an operating characteristic for the respective actual loading.

3. The method as claimed in claim 1, characterized in that torque, rotational speed, acceleration or speed of revolution are used as parameters of the individual load collectives.

4. The method as claimed in claim 1, wherein the load is distributed to selectable regions of toothing parts.

5. The method as claimed in claim 1, wherein the actual loading data are transmitted wirelessly to an electronic computer for calibration of said data.

6. The method claims claimed in claim 5, wherein the actual loading data of the components in the effect of said loading data as mechanical stress for the individual, metrological divided segments of the components are distributed approximately uniformly to individual segments or all of the segments in the manner of a balancing operation by calibration of said data via an electronic computer.

* * * * *